UNITED STATES PATENT OFFICE.

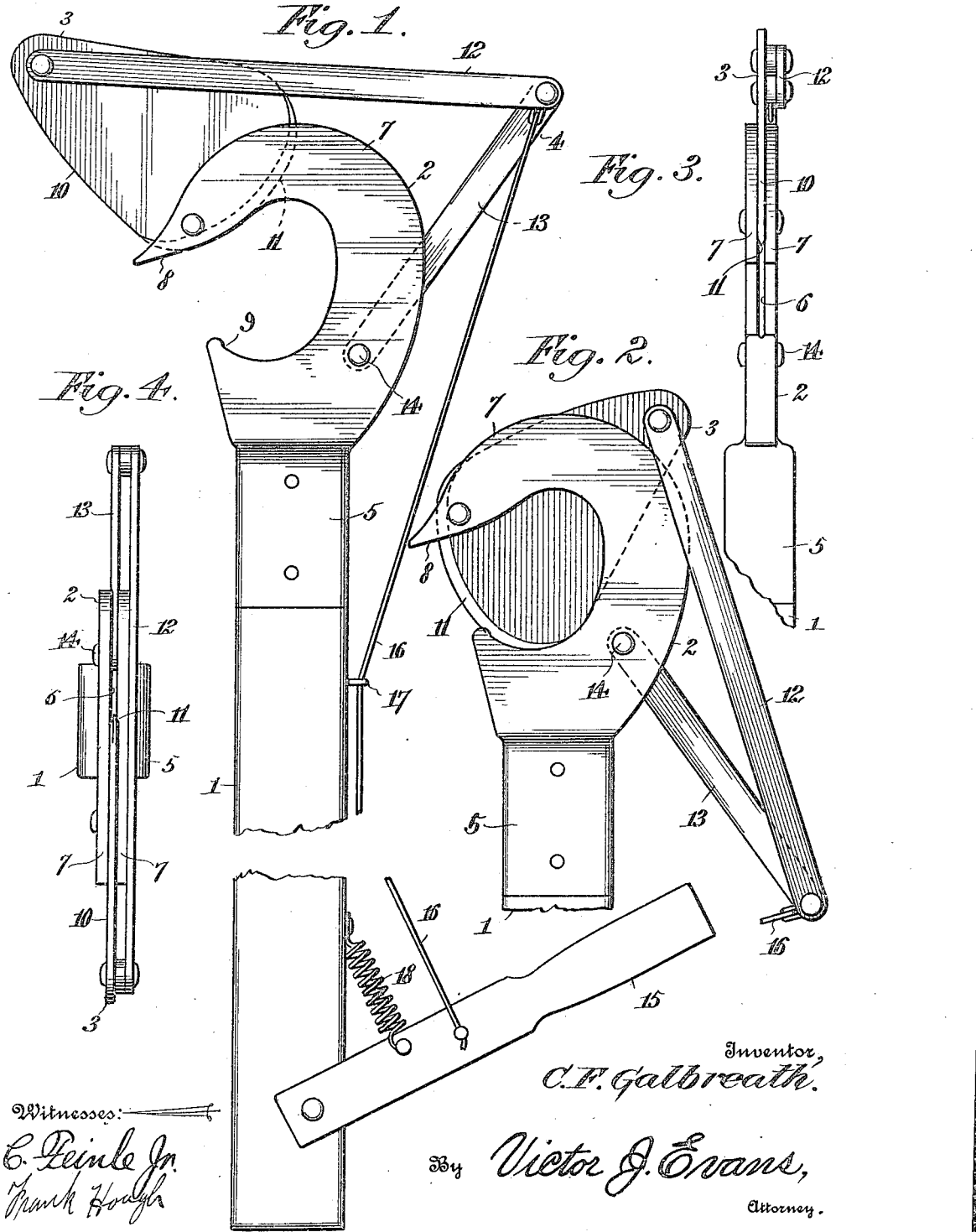

CRISTIE F. GALBREATH, OF HARTFORD, MICHIGAN.

PRUNING IMPLEMENT.

1,213,619.　　　　　Specification of Letters Patent.　　Patented Jan. 23, 1917.

Application filed October 16, 1915.　Serial No. 56,274.

*To all whom it may concern:*

Be it known that I, CRISTIE F. GALBREATH, a citizen of the United States, residing at Hartford, in the county of Van Buren and State of Michigan, have invented new and useful Improvements in Pruning Implements, of which the following is a specification.

This invention relates to a pruning implement of the type now in common use for severing small branches or limbs from a tree radiating therefrom at a considerable distance from the ground.

The primary object of the invention is to provide the implement with a hook having a limb receiving loop formed by spaced arms upon the shank of the hook, and above the same, said arms being provided with a blade having a cutting edge adapted to move downwardly between said arms and through the loop, thereby severing a limb from a tree in such a manner as to cause the weight of a portion of the limb being severed to assist the cutting edge of the blade in its passage through the loop.

A further object of the invention is to provide the hook with limb supporting portions above the shank into which merge the portion on the spaced arms forming the limb receiving loop, so that as the blade is rotated around its pivotal connection with said arms the free end of the branch which is being severed by the blade will move in a downward direction thereby preventing any impingement of the severed end on the cutting blade in its passage therethrough.

A still further object of the invention is to provide means for imparting a swinging movement to the blade of the pruning implement which will cause the cutting edge of the blade to move downwardly between said arm and through the limb receiving loop and close the entrance thereto.

A still further object of the invention is to provide the free ends of the arms on the hook which form the limb receiving loop, with beveled faces disposed above and in advance of the limb receiving loop in order that a limb to be severed from a tree may be more easily positioned within the loop.

With these and other objects in view the invention consists in the improved construction, novel combination and arrangement of parts which will be hereinafter more fully described and particularly pointed out in the claim.

The preferred embodiment of the invention has been illustrated in the accompanying drawing, although no restriction is necessarily made to the precise details of construction therein shown, as changes, alterations and modifications within the scope of the claim may be resorted to when so desired.

In the drawing:—Figure 1 is a side elevation of the improved pruning implement the handle thereof being broken away to show the parts of the implement upon a larger scale. Fig. 2 is a view similar to Fig. 1 showing the cutting blade disposed within the limb receiving loop and closing the entrance thereto. Fig. 3 is a side elevation of the pruning implement showing a portion of the interior of the limb receiving loop. Fig. 4 is a top plan view of the pruning implement.

Like characters of reference denote corresponding parts throughout the several views in the drawing.

Referring now to the drawing in detail, the improved pruning implement comprises a handle 1, a hook 2, a blade 3 and means for imparting swinging movement to the blade as indicated at 4.

The handle 1 which is of the ordinary construction, has secured to one end thereof by means of reduced portions providing a shank 5 the hook 2. The shank 5 of the hook 2 is forked as at 6 to provide upwardly extending spaced parallel arms 7, the arms 7 being of such configuration as to provide an elongated limb receiving loop above the shank on the hook and substantially in line with a line drawn through the longitudinal center of the shank. The arms 7 terminate a considerable distance above the shank of the hook and are provided with beveled ends 8 which extend beyond the body portion of the hook and in advance of the limb receiving loop formed by said arms. The ends of the arms 7 which are formed integrally with the shank 5 of the hook merge into the body in such a manner as to afford a depression in said shank which serves as a limb supporting portion at the bottom end of the limb receiving loop and below the entrance thereto as indicated at 9.

Pivotally mounted between the free ends of the arms 7 and adjacent the beveled portion thereof which serve as shoulders to guide the limb to be severed into the limb receiving loop is a blade 10 of triangular configuration and which is provided with an arcuate cutting face 11, which is normally disposed between the spaced arms 7 and extends above the limb receiving loop.

In order that the cutting edge 11 of the blade 3 may be moved downwardly between the spaced arms 7 and through the limb receiving loop, a link 12 is pivotally connected to one end of the blade 3 distant from the cutting edge thereof. To the opposite end of said link is pivotally connected a link 13 the remaining end of which is fulcrumed between the spaced arms 7 as indicated at 14. The links 12 and link 13 coöperating with each other to equally distribute the strain upon the free edge of the cutting blade imposed thereon by the unsevered portion of the end of a limb disposed in the limb receiving loop when the blade has been moved to its lowermost position.

Pivoted to the handle 1 is a spring actuated lever 15 which has connected thereto one end of a wire rod 16, said rod passing through a guide member 17 secured to the handle and having its remaining end secured to the pivotal connection of the link 12 with the link 13, whereby when the lever 15 is moved in a downward direction, the links 12 and 13 will be actuated to swing the blade 3 around its pivotal connection with the spaced arms 7 and sever the end of the limb or branch engaged by the hook.

When it is desired to use the pruning implement for removing small branches from the limbs of trees the cutting blade being in the position shown in Fig. 1 of the drawing, the beveled ends of the arms 7 are positioned upon the branch in such a manner that further movement of the handle 1 in one direction will cause said branches to be position within the limb receiving loop, and supported by the portions 9 upon the arms 7. The handle 15 is now moved in a downward direction against the tension of the spring 18 which normally serves to maintain the blade 3 through its connection with the lever 15 in a raised position, thereby causing said blade to move downwardly between the arms 7 and through the limb receiving loop and sever the free end of the branches in such a manner that the weight of the branch will not cause the end thereof which is being severed to impinge upon the edge of the blade and retard the movement of the blade through the branch.

When the operator of the pruning implement releases the lever 15 the spring 18 will cause the rod 16 and links 12 and 13 to return the blade 3 to its normal position and the pruning implement will again be ready for use.

From the foregoing description taken in connection with the accompanying drawing, it is at once apparent that a pruning implement has been provided which is simple in construction, inexpensive of manufacture and highly efficient in use.

Having thus described the invention what is claimed as new is:—

In a device of the class described, a shank having spaced parallel arms forming an elongated limb receiving loop having an entrance between its ends, said loop being disposed above the shank and in the same vertical plane to provide a limb support upon the end of the shank at the lower end of the loop, incline guide shoulders upon the free ends of the arms in advance of the entrance to the loop, a blade to be passed through said loop mounted to turn above said shoulders, and means for turning said blade.

In testimony whereof I affix my signature in presence of two witnesses.

CRISTIE F. GALBREATH.

Witnesses:
J. INGALLS,
MARY THORN.

Copies of this patent may be obtained for five cents each, by addressing the "Commissioner of Patents, Washington, D. C."